(12) United States Patent
Yamamoto et al.

(10) Patent No.: US 11,371,106 B2
(45) Date of Patent: Jun. 28, 2022

(54) HEATING METHOD AND HEATING APPARATUS FOR CENTER PILLAR FOR VEHICLE

(71) Applicant: TOYOTA JIDOSHA KABUSHIKI KAISHA, Toyota (JP)

(72) Inventors: Shinya Yamamoto, Toyota (JP); Masatomo Niihara, Okazaki (JP); Shinobu Okuma, Toyota (JP); Satoshi Yamazaki, Nagoya (JP); Naoki Sakoda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/672,585

(22) Filed: Nov. 4, 2019

(65) Prior Publication Data

US 2020/0208231 A1   Jul. 2, 2020

(30) Foreign Application Priority Data

Dec. 28, 2018 (JP) .............................. JP2018-246793

(51) Int. Cl.
| | | |
|---|---|---|
| *C21D 1/42* | (2006.01) | |
| *B62D 25/06* | (2006.01) | |
| *B62D 25/02* | (2006.01) | |
| *C21D 9/46* | (2006.01) | |

(52) U.S. Cl.
CPC .............. *C21D 1/42* (2013.01); *B62D 25/02* (2013.01); *B62D 25/06* (2013.01); *C21D 9/46* (2013.01)

(58) Field of Classification Search
None
See application file for complete search history.

(56) References Cited

U.S. PATENT DOCUMENTS

| | | | |
|---|---|---|---|
| 7,070,228 B2 * | 7/2006 | Shimizu .................. | B60R 19/18 296/187.01 |
| 2017/0314094 A1 | 11/2017 | Ooyama et al. | |
| 2019/0185957 A1 * | 6/2019 | Ihara ........................ | C21D 1/25 |

FOREIGN PATENT DOCUMENTS

JP          2016-97424 A          5/2016

\* cited by examiner

*Primary Examiner* — Scott R Kastler
(74) *Attorney, Agent, or Firm* — Oblon, McClelland, Maier & Neustadt, L.L.P.

(57) ABSTRACT

A heating method capable of changing thermal hysteresis for each part of the center pillar for the vehicle is provided. A heating method includes heating, when the center pillar for the vehicle is annealed, the center pillar by induction heating so that: a strength of a part of the first part other than the flange part becomes higher than that of the flange part of the first part, and the strength of the flange part of the first part becomes higher than that of the second part; and toughness of the second part becomes higher than that of the flange part of the first part, and the toughness of the flange part of the first part becomes higher than that of the part of the first part other than the flange part.

5 Claims, 11 Drawing Sheets

HEATING METHOD AND HEATING APPARATUS FOR CENTER PILLAR FOR VEHICLE

CROSS REFERENCE TO RELATED APPLICATIONS

This application is based upon and claims the benefit of priority from Japanese patent application No. 2018-246793, filed on Dec. 28, 2018, the disclosure of which is incorporated herein in its entirety by reference.

BACKGROUND

The present disclosure relates to a heating method and a heating apparatus for a center pillar for a vehicle (hereinafter, also simply referred to as a "center pillar"). In particular, the present disclosure relates to a heating method and a heating apparatus for heating, for example, a center pillar made of hardened steel and including a first part with a flange part formed in at least a part of its fringe part, located on an upper side of a vehicle with respect to a bead and a second part located on a lower side of the vehicle with respect to the bead when the center pillar is annealed.

In general, when a center pillar is heated, it is heated in a heating furnace, or is heated by electrical heating or laser heating. For instance, in a heating method disclosed in Japanese Unexamined Patent Application Publication No. 2016-97424, a center pillar is electrically heated by moving a movable electrode with respect to a fixed electrode in a height direction of the center pillar. Note that in the heating method according to Japanese Unexamined Patent Application Publication No. 2016-97424, a moving speed of the movable electrode is controlled so that the center pillar is heated substantially uniformly.

SUMMARY

The present inventors have found the following problem. In the case of heating a center pillar by electrical heating, it is difficult to make an electric current flow uniformly throughout a center pillar having a complex shape, thereby making it difficult to heat the center pillar. Further, in the case of heating a center pillar by a heating furnace, it is impossible to change thermal hysteresis for each part of the center pillar. Further, in the case of heating a center pillar by laser heating, it takes time to heat a wide area of the center pillar.

The present disclosure has been made in view of the above-described problems and provides a heating method and a heating apparatus for a center pillar, capable of easily changing thermal hysteresis for each part of the center pillar in a short time.

A first exemplary aspect is a method for heating a center pillar for a vehicle when the center pillar for the vehicle is annealed, the center pillar for the vehicle being made of hardened steel and including a first part located on an upper side of the vehicle with respect to a bead and a second part located on a lower side of the vehicle with respect to the bead, the first part including a flange part in at least a part of its fringe part, the method including:

heating, when the center pillar for the vehicle is annealed, the center pillar for the vehicle by induction heating so that: a strength of a part of the first part other than the flange part becomes higher than that of the flange part of the first part, and the strength of the flange part of the first part becomes higher than that of the second part; and toughness of the second part becomes higher than that of the flange part of the first part, and the toughness of the flange part of the first part becomes higher than that of the part of the first part other than the flange part, in which the heating by induction heating includes:
heating the flange part of the first part by induction heating; and
heating the second part by induction heating so that a temperature of the second part becomes higher than that of the flange part of the first part.

As described above, the flange part of the first part of the center pillar and the second part thereof are individually heated by induction heating. Therefore, it is possible to easily change thermal hysteresis for each part of the center pillar in a short time.

The above-described method for heating a center pillar for a vehicle preferably further includes cooling the center pillar for the vehicle after the center pillar for the vehicle is heated by induction heating.

Further, in the cooling of the center pillar for the vehicle, a cooling rate per unit time of the second part is preferably higher than that of the flange part of the first part.

In this way, it is possible to reduce the time spent for annealing the center pillar.

In the above-described method for heating a center pillar for a vehicle, in the heating of the second part by induction heating, the second part is preferably heated to an austenite transformation start temperature or a temperature higher than that.

As electromagnetic induction of a steel plate is weakened at or above an austenite transformation start temperature, it is easy to perform temperature control when the second part of the center pillar is heated.

In the above-described method for heating a center pillar for a vehicle, the induction heating for the second part is performed while performing the induction heating for the flange part of the first part.

In this way, it is possible to reduce the time spent for annealing the center pillar.

Another exemplary aspect is a heating apparatus for a center pillar for a vehicle used when the center pillar for the vehicle is annealed, the center pillar for the vehicle being made of hardened steel and including a first part located on an upper side of the vehicle with respect to a bead and a second part located on a lower side of the vehicle with respect to the bead, the first part including a flange part in at least a part of its fringe part, the heating apparatus including:

a first coil configured to heat the flange part of the first part by induction heating;
a first power supply electrically connected to the first coil;
a second coil configured to heat the second part by induction heating; and
a second power supply electrically connected to the second coil, in which
an amount of electric energy supplied from the second power supply to the second coil is made larger than an amount of electric energy supplied from the first power supply to the first coil so that: a strength of a part of the first part other than the flange part becomes higher than that of the flange part of the first part, and the strength of the flange part of the first part becomes higher than that of the second part; and toughness of the second part becomes higher than that of the flange part of the first part, and the toughness of the flange part of the first part becomes higher than that of the part of the first part other than the flange part.

As described above, the flange part of the first part of the center pillar and the second part thereof are individually heated by induction heating. Therefore, it is possible to easily change thermal hysteresis for each part of the center pillar in a short time.

In the above-described heating apparatus for a center pillar for a vehicle, the number of windings of the second coil around the second part is preferably larger than that of the first coil around the flange part of the first part.

In this way, it is easy to individually change thermal hysteresis for the flange part of the first part of the center pillar and that for the second part thereof.

The above-described heating apparatus for a center pillar for a vehicle, preferably further includes:

a first conductive plate disposed on a front side of the second part, the first conductive plate including a heating surface having a shape conforming to a shape of a front surface of the second part; and a second conductive plate disposed on a rear side of the second part, the second conductive plate including a heating surface having a shape conforming to a shape of a rear surface of the second part.

Further, the second coil is preferably electrically connected to surfaces of the first and second conductive plates opposite to the heating surfaces thereof, and an AC (Alternating-Current) current is preferably made to flow to the first and second conductive plates through the second coil in a state where the second part is sandwiched between the first and second conductive plates.

In this way, the second part of the center pillar can be heated more uniformly. In addition, since roughly the entire area of the second part can be heated through the first and second conductive plates, the number of windings of the coil (i.e., the number of times the coil is wound around the second part) can be reduced.

According to the present disclosure, it is possible to provide a heating method and a heating apparatus for a center pillar, capable of easily changing thermal hysteresis for each part of the center pillar in a short time.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied are described hereinafter in detail with reference to the drawings. However, the present disclosure is not limited to the below-shown embodiments. Further, the following description and drawings are simplified as appropriate for clarifying the explanation.

First Embodiment

Figure 1:
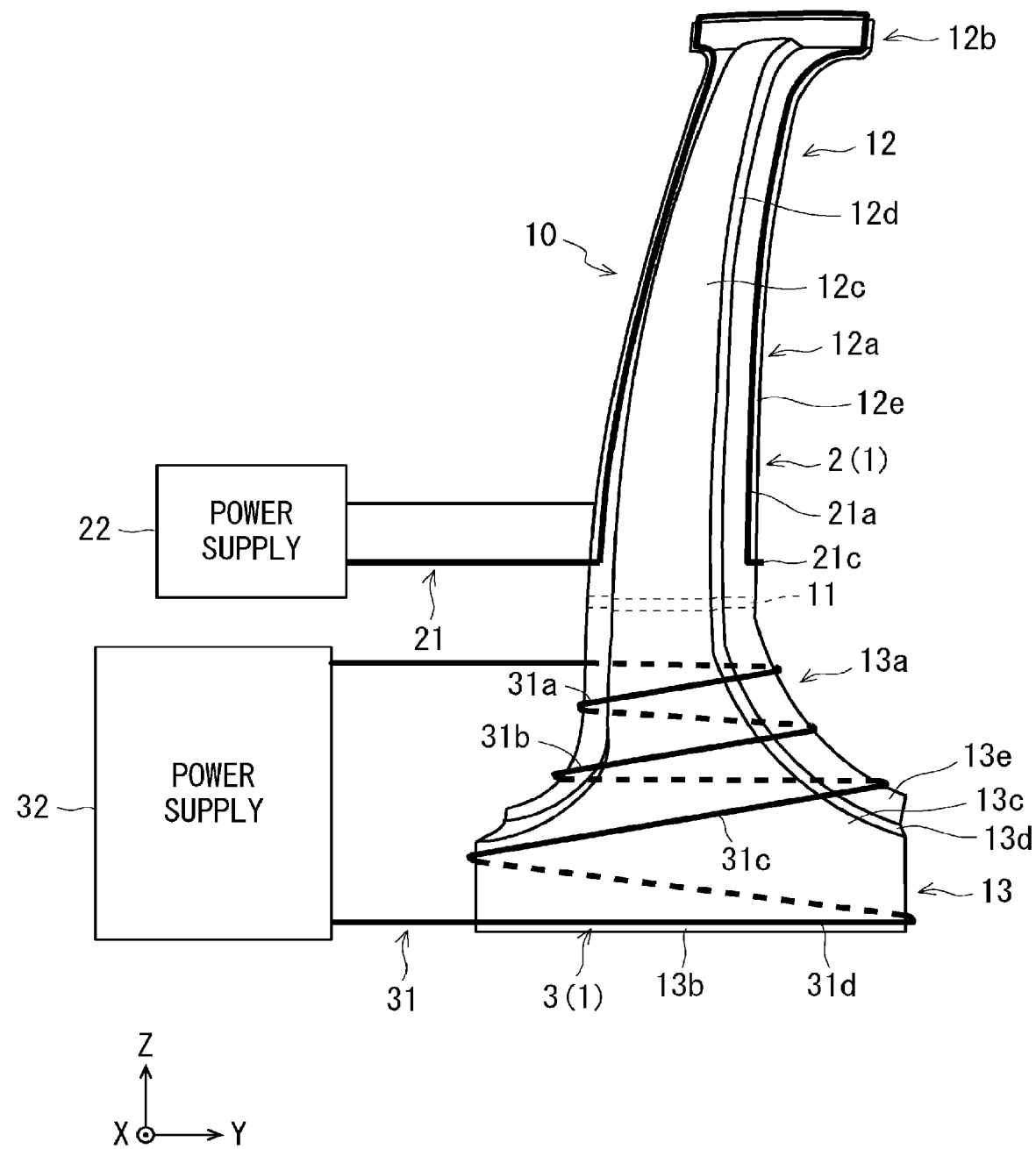
FIG. 1 shows a state where a center pillar is heated by using a heating apparatus according to a first embodiment as viewed from the front side of the center pillar.
Figure 2:
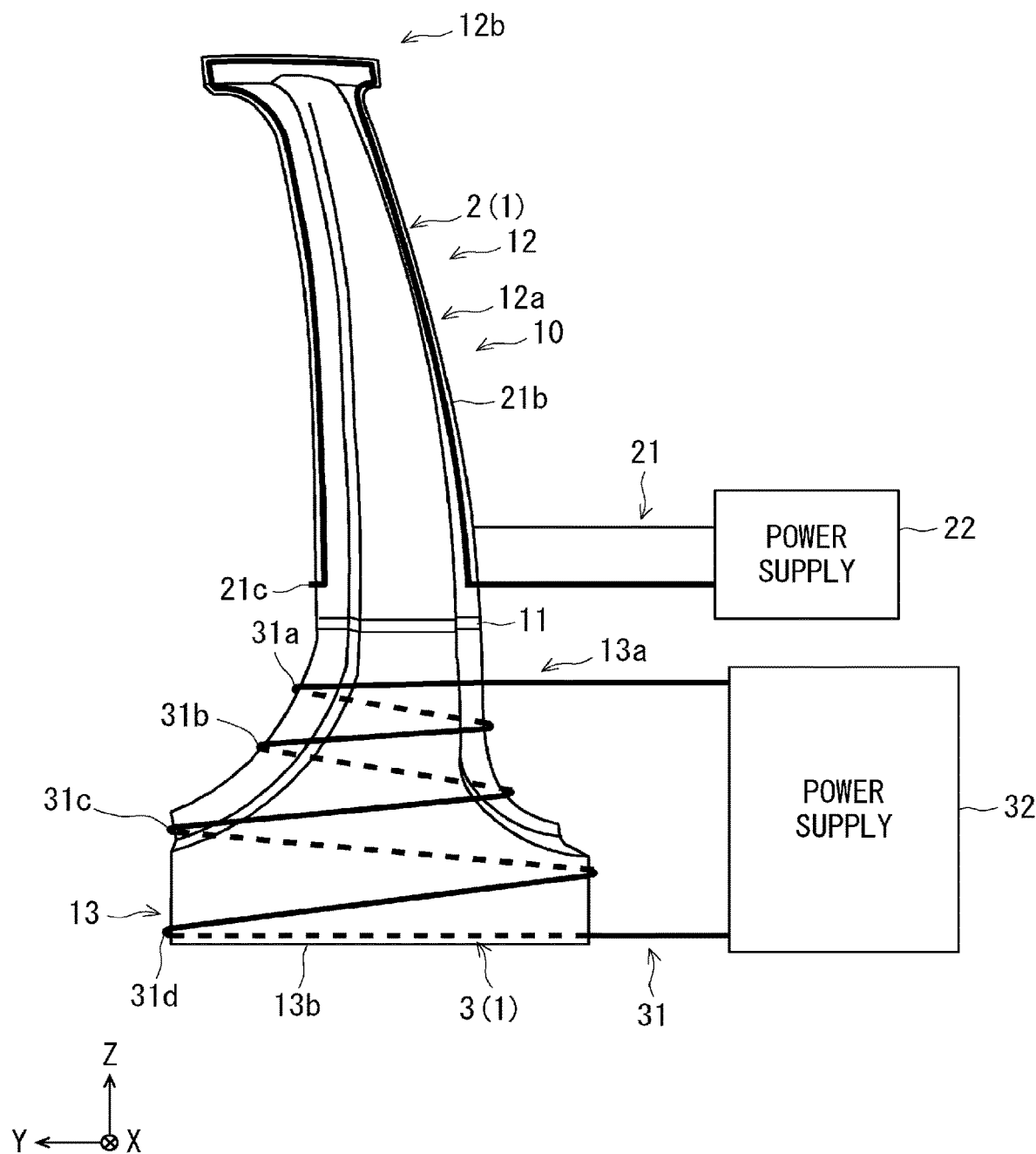
FIG. 2 shows the state where the center pillar is heated by using the heating apparatus according to the first embodiment as viewed from the rear side of the center pillar.
Figure 3:
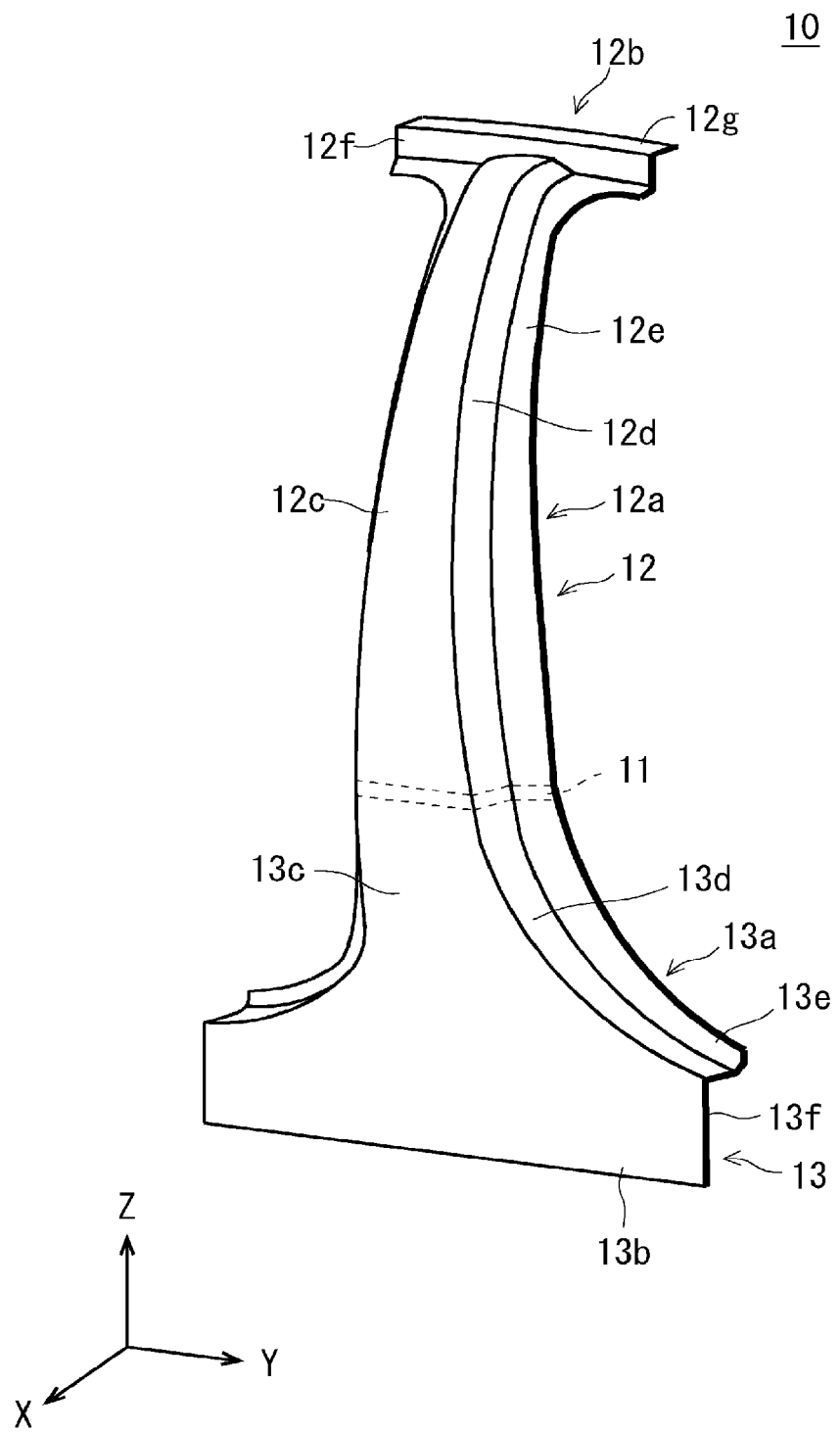
FIG. 3 is a perspective view schematically showing the center pillar heated by the heating apparatus according to the first embodiment.

FIG. 1 shows a state where a center pillar is heated by using a heating apparatus according to this embodiment as viewed from the front side of the center pillar. FIG. 2 shows the state where the center pillar is heated by using the heating apparatus according to this embodiment as viewed from the rear side of the center pillar. FIG. 3 is a perspective view schematically showing the center pillar heated by the heating apparatus according to this embodiment.

Note that in the following description, a three-dimensional (XYZ) coordinate system will be used for the sake of clarity of the description. Note that the Z-axis positive side is an upper side of a vehicle and the Z-axis negative side is a lower side of the vehicle. Further, the X-axis positive side is a front side of the center pillar (i.e., an outer side of the vehicle) and the X-axis negative side is a rear side of the center pillar (i.e., an inner side of the vehicle).

To start with, a center pillar 10, which is heated by a heating apparatus 1 according to this embodiment, is described hereinafter. The center pillar 10 is a component formed by hot-press forming in which a steel plate (e.g., a steel plate made of manganese-boron steel having a thickness of about 1 to 1.4 mm), which has been heated at a temperature higher than an austenite transformation start temperature, is press-formed into the component and then cooled at a cooling rate higher than an upper critical cooling rate. Further, roughly speaking, the center pillar 10 is entirely formed of a martensitic structure.

As shown in FIGS. 1 to 3, a bead 11 is formed on a surface on the X-axis negative side of the center pillar 10. The bead 11 is formed as a groove extending roughly in the Y-axis direction. Further, when a vehicle is subjected to an impact, the center pillar 10 is bent at the bead 11 and thereby absorbs the impact. Note that the bead 11 may be formed on a surface on the X-axis positive side of the center pillar 10.

The center pillar 10 includes a first part 12 disposed on the Z-axis positive side with respect to the bead 11 and a second part 13 disposed on the Z-axis negative side with respect to the bead 11. At least a part of the first part 12 has a so-called hat shape on an XY-cross section. Further, roughly speaking, the first part 12 extends in the Z-axis direction.

For example, the first part 12 has a roughly T-shape as viewed in the X-axis direction and includes a main-body part 12*a* and a joint part 12*b* as shown in FIG. 3. The main-body part 12*a* includes a top-plate part 12*c*, side-wall parts 12*d*, and flange parts 12*e*. Further, the main-body part 12*a* has a roughly hat shape on the XY-cross section.

Specifically, a pair of side-wall parts 12*d* extends perpendicularly from ends in the Y-axis direction of the top-plate part 12*c*, which extends roughly in the Z-axis direction, toward the X-axis negative side. Further, the flange parts 12*e* project from ends on the X-axis negative side of the side-wall parts 12*d* toward an outer side of the center pillar 10. Another steel plate for closing an opening of the main-body part 12*a* is welded to surfaces on the X-axis negative side of the flange parts 12*e*.

The joint part 12*b* is engaged with and welded to a roof of the vehicle. The joint part 12*b* has a roughly reversed L-shape as viewed in the Y-axis direction and includes a vertical part 12*f* and a horizontal part 12*g*. Specifically, the vertical part 12*f* is disposed roughly in parallel to a YZ-plane and disposed in an end on the Z-axis positive side of the main-body part 12*a*. Further, the vertical part 12*f* extends roughly in the Y-axis direction. The above-described vertical part 12*f* is welded to the roof of the vehicle in a state where the vertical part 12*f* is attached to a side of the roof.

The horizontal part 12*g* is disposed roughly in parallel to an XY-plane and projects from an end on the Z-axis positive side of the vertical part 12*f* toward the X axis negative side. Further, the horizontal part 12*g* extends roughly in the Y-axis direction. The above-described horizontal part 12*g* is welded to the roof of the vehicle in a state where the horizontal part 12*g* is hooked on the top surface of the roof.

As shown in FIG. 3, the second part 13 includes a main-body part 13*a* and a joint part 13*b*. The main-body part 13*a* includes a top-plate part 13*c*, side-wall parts 13*d*, and flange parts 13*e*. Further, the main-body part 13*a* has a roughly hat shape on the XY-cross section. Specifically, the top-plate part 13*c* is continuous with the top-plate part 12*c* of the first part 12. Further, the width in the Y-axis direction of the top-plate part 13*c* is gradually increased as it extends toward the Z-axis negative side.

The side-wall parts 13*d* extend perpendicularly from ends in the Y-axis direction of the top-plate part 13*c* toward the X axis negative side in such a manner that they are continuous with the respective side-wall parts 12*d* of the first part 12. Further, the flange parts 13*e* project from ends on the X-axis negative side of the side-wall parts 13*d* toward the outer side of the center pillar 10 in such a manner that they are continuous with the respective flange parts 12*e* of the first part 12.

The joint part 13*b* extends from the top-plate part 13*c* toward the Z-axis negative side. Further, the joint part 13*b* is welded to a chassis of the vehicle in a state where cut-out parts 13*f* formed by the joint part 13*b* and the side-wall parts 13*d* are engaged with the chassis of the vehicle.

The first part 12 of the above-described center pillar 10 is required to have a strength higher than that of the second part 13 in order to protect a passenger when the vehicle is subjected to an impact. Meanwhile, the flange parts 12*e* of the first part 12 are welded to another steel plate(s) as mentioned above. Therefore, it is necessary to lower the strength of the flange parts 12*e* in order to prevent cracking from occurring after the welding. Further, the second part 13 is required to have toughness higher than that of the first part 12 in order to absorb, when the vehicle is subjected to an impact, the impact. That is, each part of the center pillar 10 requires a different strength and a different toughness. Note that the shape of the center pillar 10 is not limited to the aforementioned shape. That is, the center pillar 10 may have any shape as long as at least a part of the fringe part of the first part 12 includes a flange part to which another steel plate is welded.

Figure 4:
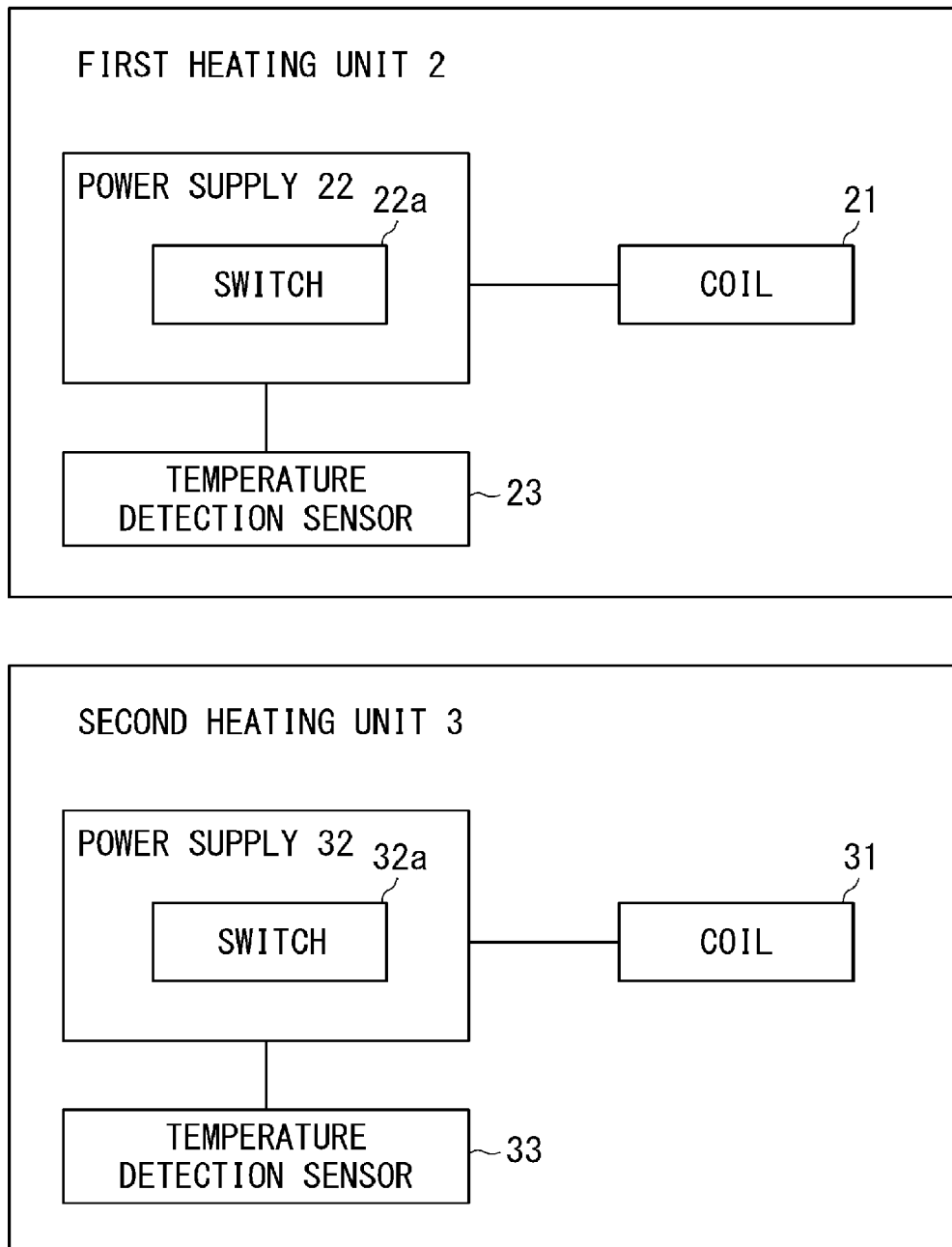
FIG. 4 is a block diagram schematically showing a configuration of a heating apparatus according to the first embodiment.

Next, a heating apparatus 1 according to this embodiment is described. FIG. 4 is a block diagram schematically showing a configuration of the heating apparatus according to this embodiment. In order to achieve the above-described properties of the center pillar 10, the heating apparatus 1 according to this embodiment is configured so that it can anneal a desired part(s) of the center pillar 10 and thereby change thermal hysteresis for each part of the center pillar 10.

As shown in FIG. 4, the heating apparatus 1 includes a first heating unit 2 and a second heating unit 3. The first heating unit 2 includes a coil (a first coil) 21 and a power supply (a first power supply) 22 and heats at least the flange parts 12*e* of the first part 12 of the center pillar 10 by induction heating.

Figure 5:
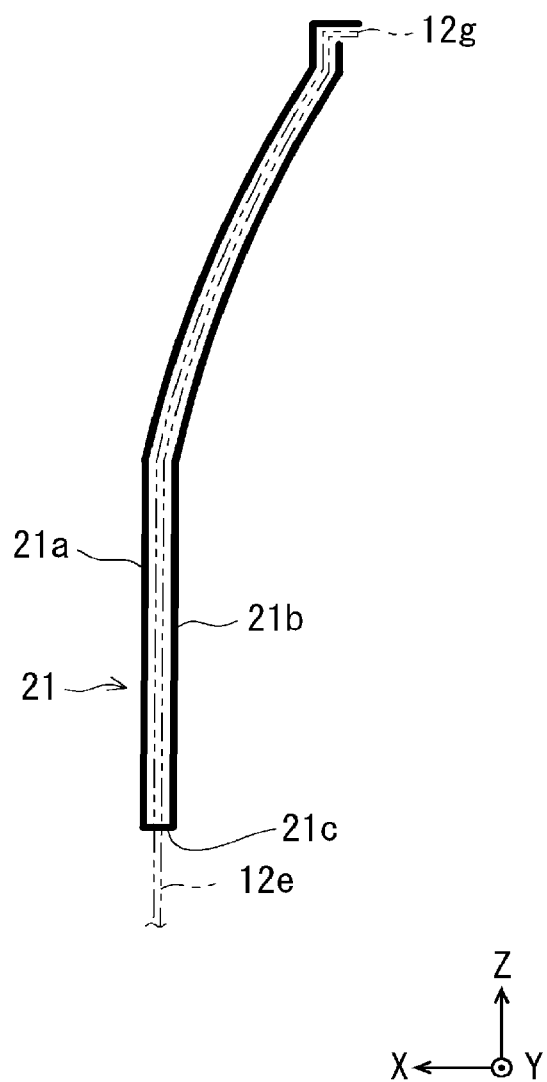
FIG. 5 schematically shows an arrangement of a coil of a first heating unit in the heating apparatus according to the first embodiment.
Figure 6:
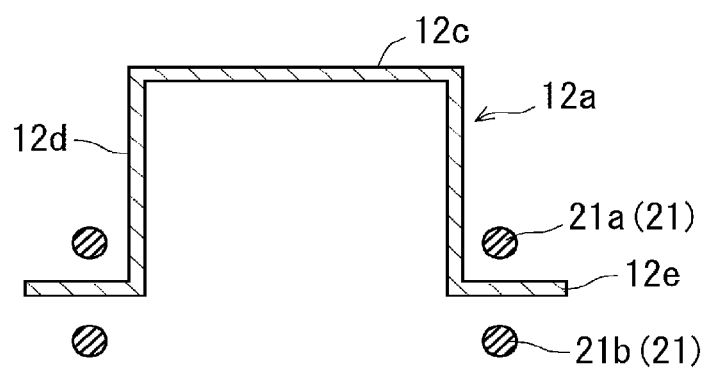
FIG. 6 is a cross section schematically showing the arrangement of the coil of the first heating unit in the heating apparatus according to the first embodiment.
Figure 6:
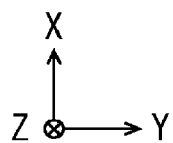

FIG. 5 schematically shows an arrangement of the coil of the first heating unit in the heating apparatus according to this embodiment. FIG. 6 is a cross section schematically showing the arrangement of the coil of the first heating unit in the heating apparatus according to this embodiment. Note that in FIG. 5, the flange part 12*e* of the first part 12 of the center pillar 10 is indicated by chain double-dashed lines in order to clarify the arrangement of the coil 21 of the first heating unit 2.

As shown in FIGS. 5 and 6, the coil 21 is disposed with a predetermined space from the first part 12 of the center pillar 10, and arranged so that the fringe part of the first part 12 is sandwiched by the coil 21 in the X-axis direction. The coil 21 is formed of a conductive tube or a conductive wire such as a copper tube. Further, as shown in FIG. 5, the coil 21 includes a first section 21*a*, a second section 21*b*, and a third section 21*c*.

As shown in FIG. 1, the first section 21*a* is disposed (i.e., laid out) so as to be routed (i.e., wired), on the X-axis positive side of the center pillar 10, along the fringe part of the first part 12 of the center pillar 10 except for the side thereof on the Z-axis negative side (i.e., except for the boundary part with the bead 11).

As shown in FIG. 2, the second section 21*b* is disposed (i.e., laid out) so as to be routed (i.e., wired), on the X-axis negative side of the center pillar 10, along the fringe part of the first part 12 of the center pillar 10 except for the side thereof on the Z-axis negative side (i.e., except for the boundary part with the bead 11). As shown in FIG. 5, the third section 21*c* is electrically connected to one of the ends of the first section 21*a* and one of the ends of the second section 21*b*.

That is, the coil 21 is disposed along the fringe part of the first part 12 of the center pillar 10 except for the side thereof on the Z-axis negative side on the X-axis positive side of the center pillar 10, passed (i.e., routed or wired) to the X-axis negative side of the center pillar 10, and disposed along the fringe part of the first part 12 of the center pillar 10 except for the side thereof on the Z-axis negative side on the X-axis negative side of the center pillar 10.

Therefore, the coil 21 is disposed so as to encircle the first part 12 of the center pillar 10 along the fringe part thereof in a state where the first part 12 is sandwiched by the coil 21 in the X-axis direction. Note that the flange parts 12*e* of the first part 12 of the center pillar 10 and the fringe part of the joint part 12*b* except for the part continuous with the main-body part 12*a* (i.e., except for the boundary part with the main-body part 12*a*) are sandwiched by the coil 21. Note that the number of windings of the coil (i.e., the number of times the coil is wound around the first part 12) means the number of times the coil is passed (i.e., routed or wired) from the front side of the center pillar 10 to the rear side thereof, or passed from the rear side of the center pillar 10 to the front side thereof.

Note that the number of windings of the coil 21 is not limited to one. That is, the coil 21 may be wound around the first part 12 a plurality of times. Further, the coil 21 may have any shape as long as at least the flange part 12*e* of the center pillar 10 can be heated and heating of other parts (such as the top-plate part 12*c* and the side-wall part 12*d*) can be suppressed.

The above-described coil 21 is configured so that it can be divided into a section disposed on the X-axis positive side of the first part 12 of the center pillar 10 and a section disposed on the X-axis negative side of the first part 12, and so that the coil 21 can be disposed in a state where the fringe part of the first part 12 is sandwiched by the coil 21.

For example, a detachable terminal is provided between the third section 21*c* and one of the first and second parts 21*a* and 21*b*. By doing so, the coil 21 can be configured so that it can be divided into the section disposed on the X-axis positive side of the first part 12 and the section disposed on the X-axis negative side of the first part 12.

However, the positon of the terminal is not limited to any particular positions as long as the coil 21 can be divided into a section disposed on the X-axis positive side of the first part 12 and a section disposed on the X-axis negative side of the first part 12.

The power supply 22 supplies an AC (Alternating-Current) current to the coil 21. Specifically, the power supply 22 is electrically connected to the other ends of the first and second sections 21*a* and 21*b* of the coil 21. As shown in FIG. 4, the power supply 22 includes a switch 22*a*. By operating the switch 22*a*, the supply of the AC current to the coil 21 is started or stopped. The switch 22*a* is controlled based on a detection result of a temperature detection sensor 23 that detects a temperature of the flange part 12*e* of the first part 12 of the center pillar 10.

The second heating unit 3 heats the second part 13 of the center pillar 10 by induction heating. Specifically, as shown in FIG. 4, the second heating unit 3 includes a coil (a second coil) 31 and a power supply (a second power supply) 32.

The coil 31 is formed of a conductive tube or a conductive wire such as a copper tube. Further, as shown in FIGS. 1 and 2, the coil 31 is disposed with a predetermined space from the second part 13 of the center pillar 10, and spirally arranged (i.e., spirally wound) along the second part 13 so as to surround the second part 13. Note that in FIGS. 1 and 2, the arrangement of the coil 31 is shown in a simplified manner to emphasize the fact that the coil 31 is spirally arranged.

The coil 31 includes a first section 31*a*, a second section 31*b*, a third section 31*c*, and a fourth section 31*d*. The first section 31*a* is a first winding section (i.e., a first turn or a first lap) of the coil 31, which is spirally wound so as to surround the second part 13 of the center pillar 10. The second section 31*b* is a second winding section of the coil 31, which is spirally wound so as to surround the second part 13 of the center pillar 10. Further, one end of the second section 31*b* is electrically connected to one end of the first section 31*a*.

The third section 31*c* is a third winding section of the coil 31, which is spirally wound so as to surround the second part 13 of the center pillar 10. Further, one end of the third section 31*c* is electrically connected to the other end of the second section 31*b*. The fourth section 31*d* is a fourth winding section of the coil 31, which is spirally wound so as to surround the second part 13 of the center pillar 10. Further, one end of the fourth section 31*d* is electrically connected to the other end of the third section 31*c*.

That is, the coil 31 is disposed so as to spirally encircle the second part 13 of the center pillar 10 four times. Note that the number of windings of the coil 31 is not limited to four. That is, the number of windings of the coil 31 may be any number as long as it is larger than the number of windings of the coil 21. Further, the coil 31 may have any shape as long as the second part 13 of the center pillar 10 can be heated substantially uniformly.

The above-described coil 31 is configured so that it can be divided into a section disposed on the X-axis positive side of the second part 13 and a section disposed on the X-axis negative side of the second part 13, and so that the coil 31 can be disposed so as to surround the second part 13 of the center pillar 10.

For example, a detachable terminal is provided in each of a section of the coil 31 where it is passed (i.e., routed or wired) from the X-axis positive side of the second part 13 of the center pillar 10 to the X-axis negative side thereof and a section of the coil 31 where it is passed from the X-axis negative side of the second part 13 to the X-axis positive side thereof. By doing so, the above-described coil 31 can be configured so that it can be divided into the section disposed on the X-axis positive side of the second part 13 and the section disposed on the X-axis negative side of the second part 13.

The power supply 32 supplies an AC current to the coil 31. Specifically, the power supply 32 is electrically connected to the other ends of the first and fourth sections 31*a* and 31*d* of the coil 31. As shown in FIG. 4, the power supply 32 includes a switch 32*a*. By operating the switch 32*a*, the supply of the AC current to the coil 31 is started or stopped. The switch 32*a* is controlled based on a detection result of a temperature detection sensor 33 that detects a temperature of the second part 13 of the center pillar 10.

Next, a flow of a heating method according to this embodiment is described. Firstly, the coil 21 of the first heating unit 2 and the coil 31 of the second heating unit 3 are disposed (i.e., routed or wired) on the center pillar 10. That is, the coil 21 is disposed along the fringe part of the first part 12 of the center pillar 10 except for the side thereof on the Z-axis negative side on the X-axis positive side of the center pillar 10, passed (i.e., routed or wired) to the X-axis negative side of the center pillar 10, and disposed along the fringe part of the first part 12 of the center pillar 10 except for the side thereof on the Z-axis negative side on the X-axis negative side of the center pillar 10. Meanwhile, the coil 31 is spirally disposed (i.e., spirally wound) around the second part 13 of the center pillar 10.

Next, the switch 22*a* of the power supply 22 of the first heating unit 2 and the switch 32*a* of the power supply 32 of the second heating unit 3 are controlled and turned on, so that AC (Alternating-Current) currents are supplied to the coils 21 and 31. As a result, electromagnetic induction occurs in the fringe part of the first part 12 of the center pillar 10 except for the side thereof on the Z-axis negative side and in the second part 13, and hence the fringe part of the first part 12 of the center pillar 10 except for the side thereof on the Z-axis negative side and the second part 13 are heated. That is, in this embodiment, the induction heating for the second part 13 is performed while performing the induction heating for the fringe part of the first part 12 of the center pillar 10 except for the side thereof on the Z-axis negative side.

Note that the center pillar 10 is heated so that: a strength of the part of the first part 12 of the center pillar 10 other than the flange part 12e (e.g., the top plate part 12c and the side wall part 12d) becomes higher than that of the flange part 12e of the first part 12, and the strength of the flange part 12e of the first part 12 becomes higher than that of the second part 13; and toughness of the second part 13 of the center pillar 10 becomes higher than that of the flange part 12e of the first part 12, and the toughness of the flange part 12e of the first part 12 becomes higher than that of the part of the first part 12 other than the flange part 12e.

Note that when a hardened steel plate is annealed, its strength becomes lower as the steel plate is heated to a higher temperature. In contrast, the toughness of the steel plate becomes higher as the steel plate is heated to a higher temperature. Therefore, the power supply 32 of the second heating unit 3 supplies a larger AC current to the coil 31 than the AC current that the power supply 22 of the first heating unit 2 supplies to the coil 21, or supplies an AC current to the coil 31 for a time period longer than the time period during which the power supply 22 of the first heating unit 2 supplies an AC current to the coil 21. By doing so, the heating is performed so that the temperature of the second part 13 of the center pillar 10 becomes higher than that of the flange part 12e of the first part 12, and the temperature of the flange part 12e of the first part 12 becomes higher than that of the part of the first part 12 other than the flange part 12e. That is, the amount of electric energy supplied from the power supply 32 of the second heating unit 3 to the coil 31 is made larger than the amount of electric energy supplied from the power supply 22 of the first heating unit 2 to the coil 21.

Specifically, the second part 13 of the center pillar 10 is heated to a first temperature (e.g., about 730° C.) at which the toughness of the second part 13 is lowered to such a level that the second part 13 can absorb, when the vehicle is subjected to an impact, the impact. Note that the first temperature is preferably equal to or higher than an austenite transformation start temperature of the steel plate of which the center pillar 10 is formed.

The electromagnetic induction of the steel plate is weakened at or above the austenite transformation start temperature. Therefore, for example, even when the temperature of the second part 13 reaches the first temperature, the switch 32a of the power supply 32 of the second heating unit 3 does not necessarily have to be accurately controlled. Therefore, it is easy to perform temperature control when the second part 13 of the center pillar 10 is heated. Through this process, the second part 13 of the center pillar 10 has toughness by which the second part 13 can absorb, when the vehicle is subjected to an impact, the impact. Further, the strength of the second part 13 is lowered to such a level that cracking is prevented from occurring after the second part 13 is welded to the chassis of the vehicle body.

In contrast, the flange part 12e of the first part 12 of the center pillar 10 is heated to a second temperature (e.g., about 500° C.) at which the strength of the flange part 12e can be lowered to such a level that cracking is prevented from occurring after the flange part 12e is welded to other steel plates.

In this process, when the temperature detection sensor 23 of the first heating unit 2 detects that the temperature of the flange part 12e of the first part 12 of the center pillar 10 has reached the second temperature, the switch 22a is controlled and turned off, so that the supply of the AC power to the coil 21 is stopped. In this process, the fringe part of the joint part 12b of the first part 12 of the center pillar 10 except for the part continuous with the main-body part 12a (i.e., except for the boundary part with the main-body part 12a) is also heated to the second temperature.

Figure 7:
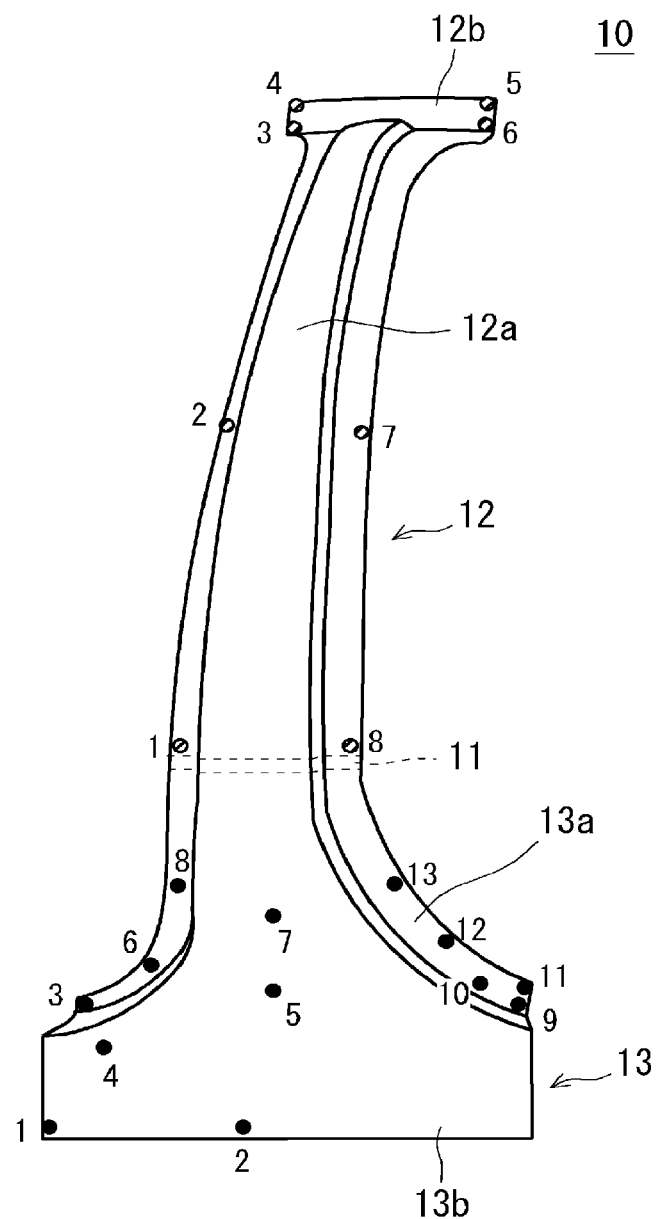
FIG. 7 shows temperature measuring points in a center pillar heated by a heating method according to the first embodiment.
Figure 8:
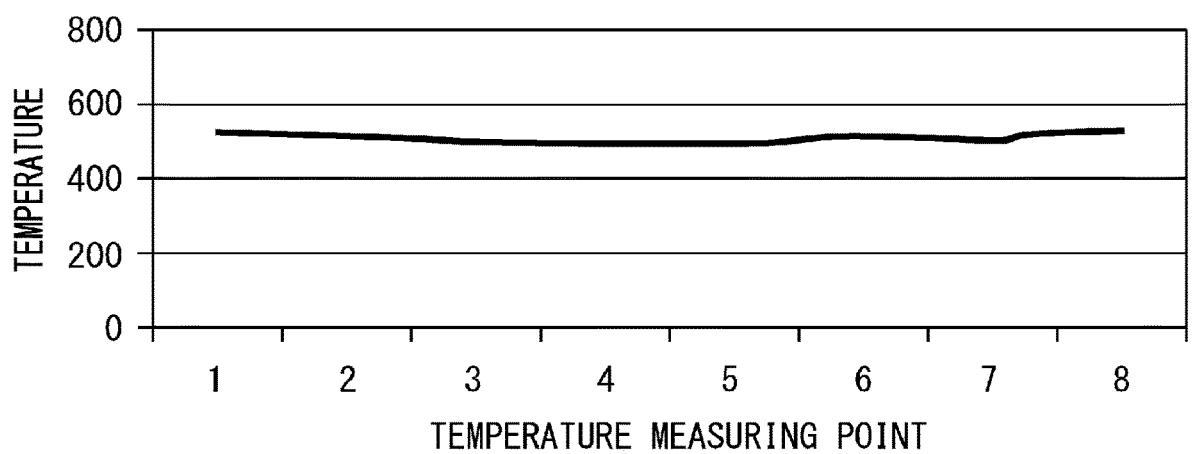
FIG. 8 shows a temperature distribution in a first part of the center pillar heated by the heating method according to the first embodiment.
Figure 9:
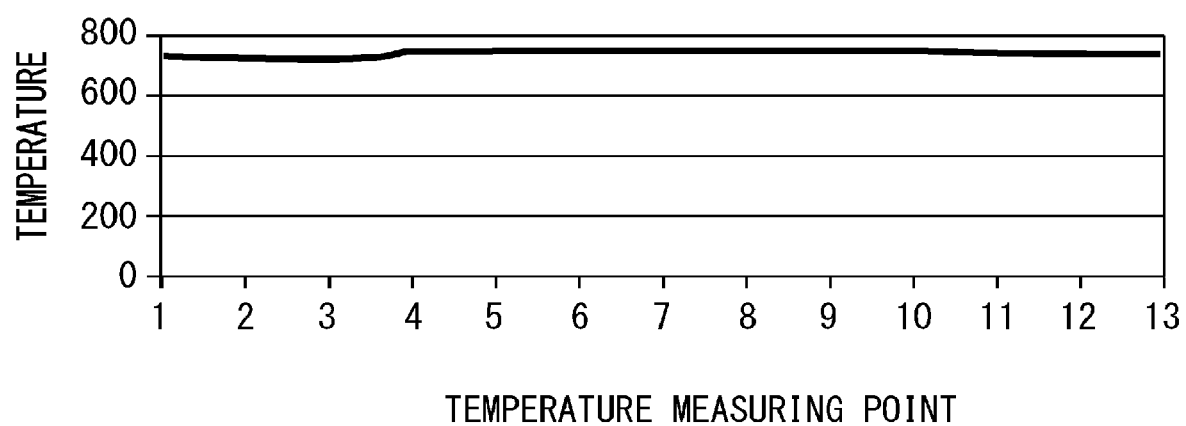
FIG. 9 shows a temperature distribution in a second part of the center pillar heated by the heating method according to the first embodiment.

FIG. 7 shows temperature measuring points in the center pillar heated by the heating method according to this embodiment. FIG. 8 shows a temperature distribution in the first part of the center pillar heated by the heating method according to this embodiment. FIG. 9 shows a temperature distribution in the second part of the center pillar heated by the heating method according to this embodiment. Note that in FIG. 7, circles with hatching indicate temperature measuring points in the first part 12 and black circles indicate temperature measuring points in the second part 13.

In the heating method according to this embodiment, the center pillar 10 is heated by induction heating. Therefore, as shown in FIG. 8, the fringe part of the first part 12 of the center pillar 10 except for the side thereof on the Z-axis negative side can be heated substantially uniformly to about 500° C. Further, as shown in FIG. 9, the second part 13 of the center pillar 10 can be heated substantially uniformly to about 730° C.

As described above, in the heating method and the heating apparatus 1 according to this embodiment, the flange parts 12e of the first part 12 of the center pillar 10 and the second part 13 thereof are individually heated by induction heating. The induction heating makes it possible to easily heat a component having a complex shape, such as the center pillar 10, as compared to the ordinary electrical heating. Further, the induction heating makes it possible to heat a large area in a short time as compared to the ordinary laser heating. Further, when the flange parts 12e of the first part 12 of the center pillar 10 and the second part 13 thereof are individually heated by induction heating as performed in the heating method and the heating apparatus 1 according to this embodiment, it is possible to change thermal hysteresis for each part of the center pillar 10 as compared to the heating using an ordinary heating furnace. Therefore, in the heating method and the heating apparatus 1 according to this embodiment, it is possible to easily change thermal hysteresis for each part of the center pillar 10 in a short time.

In particular, in the induction heating, the coil 21 of the first heating unit 2 and the coil 31 of the second heating unit 3 can be selectively arranged (selectively laid out) in parts where the center pillar 10 needs to be heated. Therefore, it is possible to easily change thermal hysteresis for each part of the center pillar 10.

In addition, in this embodiment, when the center pillar 10 is heated, the strengths of the fringe part of the joint part 12b except for the part continuously connected to the main-body part 12a and the second part 13 are lowered to such a level that cracking is prevented from occurring after they are welded to the vehicle body. Therefore, it is possible to reduce the time spent for the process for annealing the center pillar 10.

Further, in this embodiment, the induction heating for the second part 13 is performed while performing the induction heating for the fringe part of the first part 12 of the center pillar 10 except for the side thereof on the Z-axis negative side. Therefore, the time spent for the process for annealing the center pillar 10 can be further reduced.

Note that the heated center pillar 10 is preferably cooled at a cooling rate higher than an upper critical cooling rate in order to prevent the strengths and the toughness of the fringe part of the first part 12 of the heated center pillar 10 except for the side on the Z-axis negative side and the second part 13 from changing again toward their original values. In particular, the cooling rate per unit time of the second part 13 of the center pillar 10 is preferably higher than that of the fringe part of the first part 12 of the heated center pillar 10 except for the side on the Z-axis negative side. In this way, it is possible to reduce the time spent for the process for annealing the center pillar 10.

Second Embodiment

A heating apparatus according to a second embodiment is configured so that it can heat a second part 13 of a center pillar 10 more uniformly as compared to the heating apparatus 1 according to the first embodiment. Note that the heating apparatus according to this embodiment has substantially the same configuration as that of the heating apparatus 1 according to the first embodiment. Therefore, duplicated descriptions are omitted and the same symbols are assigned to the same components.

Figure 10:
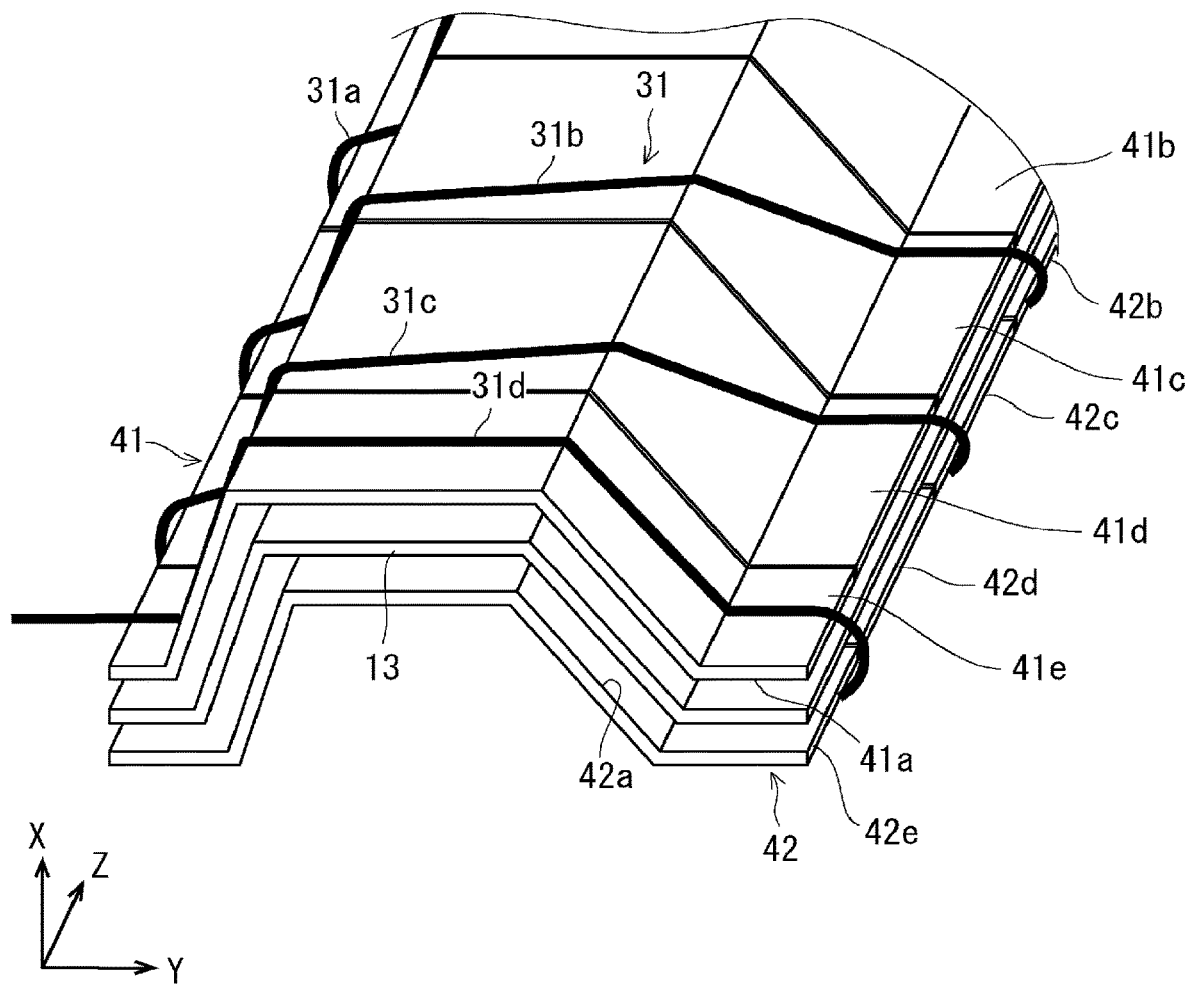
FIG. 10 is a perspective view schematically showing a second heating unit of a heating apparatus according to a second embodiment.
Figure 11:
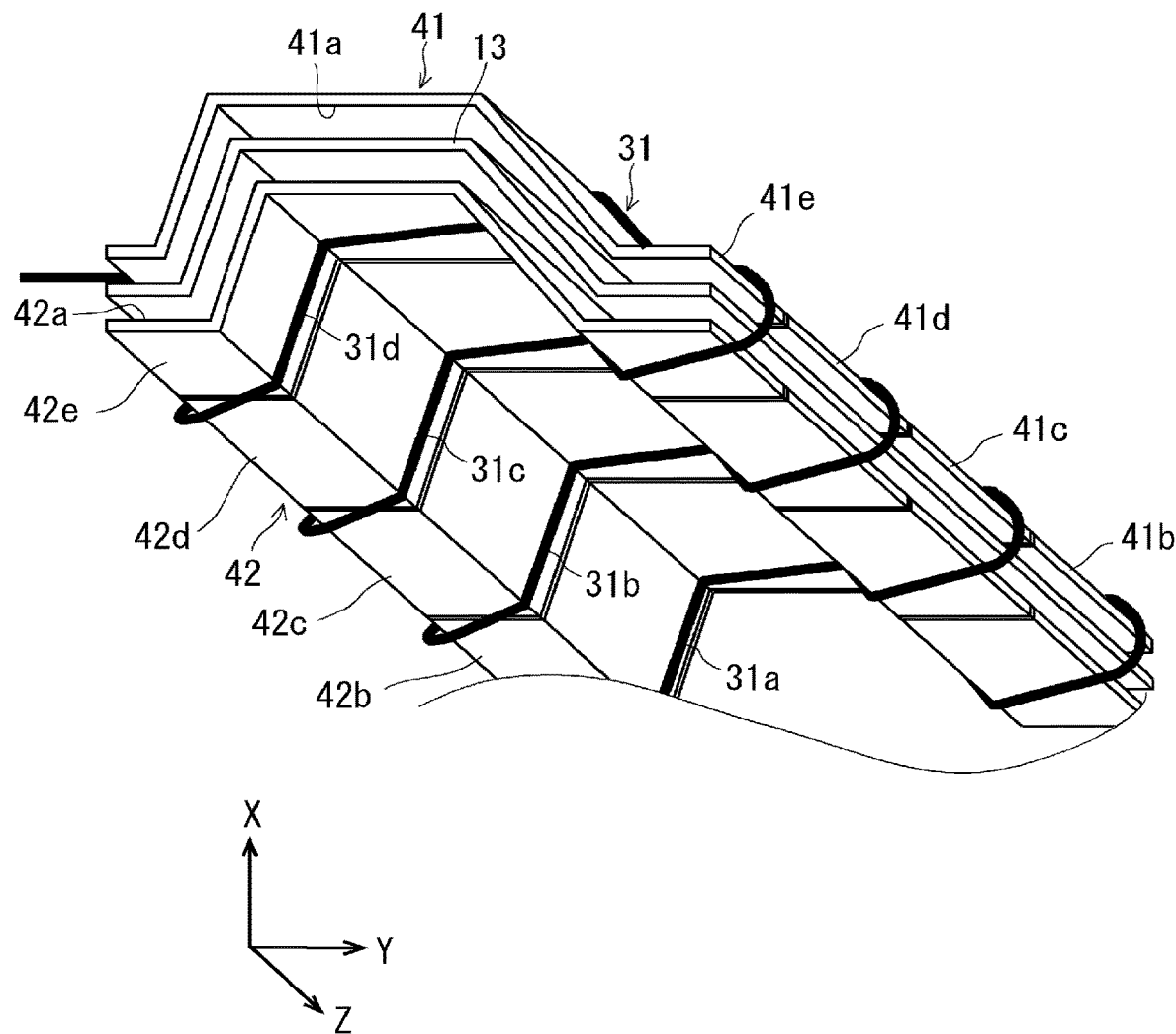
FIG. 11 is a different perspective view schematically showing the second heating unit of the heating apparatus according to the second embodiment.

FIG. 10 is a perspective view schematically showing a second heating unit of a heating apparatus according to this embodiment. FIG. 11 is a different perspective view schematically showing the second heating unit of the heating apparatus according to this embodiment. Note that the power supply 32 and the like are omitted in FIGS. 10 and 11. Further, the second part 13 and the like of the center pillar 10 are shown in a simplified manner in FIGS. 10 and 11.

In the heating apparatus according to this embodiment, the second heating unit includes a first conductive plate 41 and a second conductive plate 42 as shown in FIGS. 10 and 11. The first conductive plate 41 is disposed on the X-axis positive side with respect to the second part 13 of the center pillar 10. The first conductive plate 41 includes a heating surface 41a having a shape conforming to the shape of the surface on the X-axis positive side of the second part 13 of the center pillar 10. Further, the first conductive plate 41 is fixed so that a section of the coil 31 of the second heating unit 3, disposed on the X-axis positive side of the second part 13 is electrically connected to the surface on the X-axis positive side of the first conductive plate 41.

The above-described first conductive plate 41 is divided into a first divided section 41b to which the first section 31a of the coil 31 is electrically connected, a second divided section 41c to which the second section 31b of the coil 31 is electrically connected, a third divided section 41d to which the third section 31c of the coil 31 is electrically connected, and a fourth divided section 41e to which the fourth section 31d of the coil 31 is electrically connected. That is, the first conductive plate 41 is divided into a plurality of sections each of which corresponds to a part of one winding (i.e., one turn or one lap) of the coil 31 encircling the second part 13 of the center pillar 10, located on the X-axis positive side.

Note that each of the first section 31a of the coil 31 electrically connected to the first divided section 41b, the second section 31b of the coil 31 electrically connected to the second divided section 41c, the third section 31c of the coil 31 electrically connected to the third divided section 41d, and the fourth section 31d of the coil 31 electrically connected to the fourth divided section 41e may be branched into a plurality of wires.

The second conductive plate 42 is disposed on the X-axis negative side of the second part 13 of the center pillar 10. The second conductive plate 42 includes a heating surface 42a having a shape conforming to the shape of the surface on the X-axis negative side of the second part 13 of the center pillar 10. Further, the second conductive plate 42 is fixed so that a part of the coil 31 of the second heating unit 3, disposed on the X-axis negative side of the second part 13 is electrically connected to the surface on the X-axis negative side of the second conductive plate 42.

The above-described second conductive plate 42 is divided into a first divided section 42b to which the first section 31a of the coil 31 is electrically connected, a second divided section 42c to which the second section 31b of the coil 31 is electrically connected, a third divided section 42d to which the third section 31c of the coil 31 is electrically connected, and a fourth divided section 42e to which the fourth section 31d of the coil 31 is electrically connected. That is, the second conductive plate 42 is divided into a plurality of sections each of which corresponds to a part of one winding (i.e., one turn or one lap) of the coil 31 encircling the second part 13 of the center pillar 10, located on the X-axis positive side.

Note that each of the first section 31a of the coil 31 electrically connected to the first divided section 42b, the second section 31b of the coil 31 electrically connected to the second divided section 42c, the third section 31c of the coil 31 electrically connected to the third divided section 42d, and the fourth section 31d of the coil 31 electrically connected to the fourth divided section 42e may be branched into a plurality of wires.

Each of the first and second conductive plates 41 and 42 is made of, for example, copper (may be made of any conductive material) and is configured so that an AC current flows through the coil 31 of the second heating unit 3. Further, similarly to the coil 31 in the first embodiment, a detachable terminal is provided in each of a section of the coil 31 where it is passed (i.e., routed or wired) from the X-axis positive side of the second part 13 of the center pillar 10 to the X-axis negative side thereof and a section of the coil 31 where it is passed from the X-axis negative side of the second part 13 to the X-axis positive side thereof so that the first and second conductive plates 41 and 42 can be moved close to each other and away from each other in the X-axis direction.

When the second part 13 of the center pillar 10 is heated by using the above-described second heating unit, the second part 13 is sandwiched between the first and second conductive plates 41 and 42. Then, when an AC current is supplied from the power supply 32, the supplied AC current flows to the first and second conductive plates 41 and 42 through the coil 31. As a result, electromagnetic induction occurs in the second part 13 disposed between the first and second conductive plates 41 and 42, and therefore the second part 13 is heated.

In this process, since roughly the entire area of the second part 13 of the center pillar 10 is covered by the first and second conductive plates 41 and 42, electromagnetic induction can occur over roughly the entire area of the second part 13. As a result, the second part 13 can be heated substantially uniformly. In addition, since roughly the entire area of the second part 13 can be heated through the first and second conductive plates 41 and 42, the number of windings of the coil 31 (i.e., the number of times the coil 31 is wound around the second part 13) can be reduced as compared to that in the heating apparatus 1 according to the first embodiment.

Since each of the first and second conductive plates 41 and 42 has a divided structure, it is possible to prevent the AC current supplied from the first section 31a of the coil 31 to the first and second conductive plates 41 and 42 from flowing out from the fourth section 31d through the shortest path, and thereby to make the AC current flow throughout a wide area of the first and second conductive plates 41 and 42. In this way, it is possible to make electromagnetic induction occur over roughly the entire area of the second part 13 of the center pillar 10.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for heating a center pillar for a vehicle when the center pillar for the vehicle is annealed, the center pillar for the vehicle being made of hardened steel and including a first part located on an upper side of the vehicle with respect to a bead and a second part located on a lower side of the vehicle with respect to the bead, the first part including a flange part provided at a periphery of the first part, the method comprising:

heating, when the center pillar for the vehicle is annealed, the center pillar for the vehicle by induction heating so that: a strength of a part of the first part other than the flange part becomes higher than that of the flange part of the first part, and the strength of the flange part of the first part becomes higher than that of the second part; and toughness of the second part becomes higher than that of the flange part of the first part, and the toughness of the flange part of the first part becomes higher than that of the part of the first part other than the flange part, wherein the heating by induction heating comprises:
heating the flange part of the first part by induction heating using a first coil electrically connected to a first power supply; and
heating the second part by induction heating using a second coil electrically connected to a second power supply so that a temperature of the second part becomes higher than that of the flange part of the first part, the heating of the flange part of the first part and the heating of the second part occurring at a same time.

2. The method for heating a center pillar for a vehicle according to claim 1, further comprising cooling the center pillar for the vehicle after the center pillar for the vehicle is heated by induction heating, wherein
in the cooling of the center pillar for the vehicle, a cooling rate per unit time of the second part is higher than that of the flange part of the first part.

3. The method for heating a center pillar for a vehicle according to claim 1, wherein in the heating of the second part by induction heating, the second part is heated to an austenite transformation start temperature or a temperature higher than the austenite transformation start temperature.

4. The method for heating a center pillar for a vehicle according to claim 1, wherein the induction heating for the second part is performed while performing the induction heating for the flange part of the first part.

5. The method for heating a center pillar for a vehicle according to claim 1, wherein a first current supplied by the first power supply is larger than a second current supplied by the second power supply or the second current is supplied by the second power supply for a time longer that of the first current supplied by the first power supply.

* * * * *